(12) United States Patent
Larsen et al.

(10) Patent No.: US 8,671,573 B2
(45) Date of Patent: Mar. 18, 2014

(54) METHOD OF FORMING FASTENABLE MEMBER FOR SEALING, BAFFLING OR REINFORCING

(75) Inventors: Douglas C. Larsen, Highland, MI (US); Thomas D. Kleino, Rochester Hills, MI (US); Abraham Kassa, Shelby Township, MI (US); William J. Barz, St. Clair, MI (US); Matthew Harthcock, Oakland Township, MI (US)

(73) Assignee: Zephyros, Inc., Romeo, MI (US)

( * ) Notice: Subject to any disclaimer, the term of this patent is extended or adjusted under 35 U.S.C. 154(b) by 273 days.

(21) Appl. No.: 13/088,508

(22) Filed: Apr. 18, 2011

(65) Prior Publication Data

US 2011/0192015 A1    Aug. 11, 2011

Related U.S. Application Data

(63) Continuation of application No. 11/767,755, filed on Jun. 25, 2007, now Pat. No. 7,941,925, which is a continuation of application No. 10/873,935, filed on Jun. 22, 2004, now Pat. No. 7,249,415.

(60) Provisional application No. 60/482,896, filed on Jun. 26, 2003.

(51) Int. Cl.
*B21D 53/88* (2006.01)
*B23P 17/00* (2006.01)
*B29C 47/04* (2006.01)

(52) U.S. Cl.
USPC ........ 29/897.2; 29/417; 29/525.01; 29/527.1; 264/173.16; 296/187.02; 277/650

(58) Field of Classification Search
USPC ............ 29/897.2, 412, 417, 428, 458, 469.5, 29/525.01, 525.11, 525.12, 527.1, 527.2, 29/897, 897.1; 264/173.11, 173.16, 264/173.17, 177.1; 277/650, 651, 906, 922, 277/930, 931, 935, 944
See application file for complete search history.

(56) References Cited

U.S. PATENT DOCUMENTS

| | | | |
|---|---|---|---|
| 625,559 A | 5/1899 | Keeler | |
| 4,751,249 A | 6/1988 | Wycech | |
| 4,813,690 A | 3/1989 | Coburn, Jr. | |
| 4,901,500 A | 2/1990 | Wycech | |
| 5,266,133 A | 11/1993 | Hanley et al. | |
| 5,344,208 A * | 9/1994 | Bien et al. | 296/187.02 |

(Continued)

FOREIGN PATENT DOCUMENTS

| | | |
|---|---|---|
| DE | 3838655 A1 | 5/1990 |
| DE | 19812288 C1 | 2/1998 |

(Continued)

OTHER PUBLICATIONS

Opposition for European Patent No. 1790554B1; Dated Jun. 20, 2012.

(Continued)

*Primary Examiner* — Jermie Cozart
(74) *Attorney, Agent, or Firm* — The Dobrusin Law Firm, PC

(57) ABSTRACT

There is disclosed a member for sealing, baffling and/or reinforcing components of an automotive vehicle. The assembly generally includes a carrier, an expandable material and at least one fastener.

20 Claims, 6 Drawing Sheets

(56) References Cited

U.S. PATENT DOCUMENTS

| | | | |
|---|---|---|---|
| 5,358,397 A | 10/1994 | Ligon | |
| 5,575,526 A | 11/1996 | Wycech | |
| 5,631,027 A * | 5/1997 | Takabatake | 425/4 R |
| 5,708,042 A | 1/1998 | Hasegawa | |
| 5,755,486 A | 5/1998 | Wycech | |
| 5,766,719 A | 6/1998 | Rimkus | |
| 5,932,680 A | 8/1999 | Heider | |
| 6,068,922 A | 5/2000 | Vercesi et al. | |
| 6,131,897 A | 10/2000 | Barz et al. | |
| 6,150,428 A | 11/2000 | Hanley, IV | |
| 6,199,940 B1 | 3/2001 | Hopton | |
| 6,207,244 B1 | 3/2001 | Hesch | |
| 6,270,600 B1 | 8/2001 | Wycech | |
| 6,276,105 B1 | 8/2001 | Wycech | |
| 6,287,666 B1 | 9/2001 | Wycech | |
| 6,296,298 B1 | 10/2001 | Barz | |
| 6,368,438 B1 | 4/2002 | Chang | |
| 6,389,775 B1 | 5/2002 | Steiner | |
| 6,413,611 B1 | 7/2002 | Roberts | |
| 6,422,575 B1 | 7/2002 | Czaplicki | |
| 6,455,146 B1 | 9/2002 | Fitzgerald | |
| 6,546,693 B2 | 4/2003 | Wycech | |
| 6,620,501 B1 | 9/2003 | Kassa | |
| 6,706,772 B2 | 3/2004 | Czaplicki | |
| 6,786,533 B2 | 9/2004 | Bock | |
| 6,811,864 B2 | 11/2004 | Czaplicki | |
| 6,820,923 B1 | 11/2004 | Bock | |
| 6,846,559 B2 | 1/2005 | Czaplicki | |
| 6,920,693 B2 | 7/2005 | Hankins | |
| 6,926,784 B2 | 8/2005 | Bock | |
| 6,991,237 B2 | 1/2006 | Kassa | |
| 7,011,315 B2 | 3/2006 | Czaplicki | |
| 7,043,815 B2 * | 5/2006 | Lande et al. | 29/430 |
| 7,077,460 B2 | 7/2006 | Czaplicki | |
| 7,169,467 B2 | 1/2007 | Wilson | |
| 7,199,165 B2 | 4/2007 | Kassa | |
| 2003/0045620 A1 | 3/2003 | Carlson et al. | |
| 2006/0020076 A1 | 1/2006 | Finerman | |
| 2007/0193171 A1 | 8/2007 | Finerman | |

FOREIGN PATENT DOCUMENTS

| | | |
|---|---|---|
| DE | 19856255 C1 | 3/1998 |
| DE | 19648164 A1 | 5/1998 |
| DE | 29904705 U1 | 6/1999 |
| EP | 0383498 A2 | 8/1990 |
| EP | 453777 A2 * | 10/1991 |
| EP | 0697956 B1 | 2/1996 |
| EP | 0893332 A1 | 1/1999 |
| EP | 1122152 A2 | 8/2001 |
| EP | 1149679 A2 | 10/2001 |
| EP | 1435320 A | 7/2004 |
| GB | 903146 | 8/1962 |
| JP | 9328568 A | 12/1997 |
| JP | 2002221968 A | 8/2002 |
| JP | 2002331960 A | 11/2002 |
| WO | 95/25005 | 9/1995 |
| WO | 97/02967 | 1/1997 |
| WO | 98/50221 | 5/1998 |
| WO | 98/36944 | 8/1998 |
| WO | 98/36944 A1 | 8/1998 |
| WO | 99/08854 | 2/1999 |
| WO | 00/46017 | 8/2000 |
| WO | 01/19667 A1 | 3/2001 |
| WO | 01/54936 | 8/2001 |
| WO | 01/88033 | 11/2001 |
| WO | 2005/077634 A2 | 8/2005 |
| WO | 2005/113689 | 12/2005 |

OTHER PUBLICATIONS

Original Opposition Notice dated Mar. 7, 2012.
Opposition for European Patent No. 1790554 (translation).
International Search Report for corresponding PCT/US2004/020112; filed Jun. 23, 2004.
Final Rejection mailed Feb. 8, 2011 for corresponding Korean Application 2005-7024978, filed Dec. 26, 2005.
Office Action mailed Oct. 8, 2010 for corresponding Japanese Application 2006-517571, filed Jun. 23, 2004.
Peter Born; Bernd Mayer Structural Bonding in Automotive Applications.
Gregory W. Hopton; Philip E. Weber; Leslie J. Osenkowski; Gerald J.Renand, Application of a Structural Reinforcing Material to Improve Vehicle NVH Characteristics.
Kurt Lilley; Eric Seifferlein; Anita Zalobsky Comparison of Preformed Acoustic Baffles and Two-Component Polyurethane Foams for Filling Body Cavities.
Kurt M. Lilley; Michael J. Fasse; Philip E. Weber A Comparison of NVH Treatments for Vehicle Floorplan Applicaitons.
Kurt M. Lilley; Phil E. Weber Vehicle Acoustic Solutions.
Minutes of the oral proceedings before the Opposition Division dated Dec. 16, 2013 (Appln. No. EP07003645.4).
Summons to attend oral proceedings pursuant to Rule 115(1) EPC dated Jan. 17, 2014 (Appln. No. EP07003645.4).

* cited by examiner

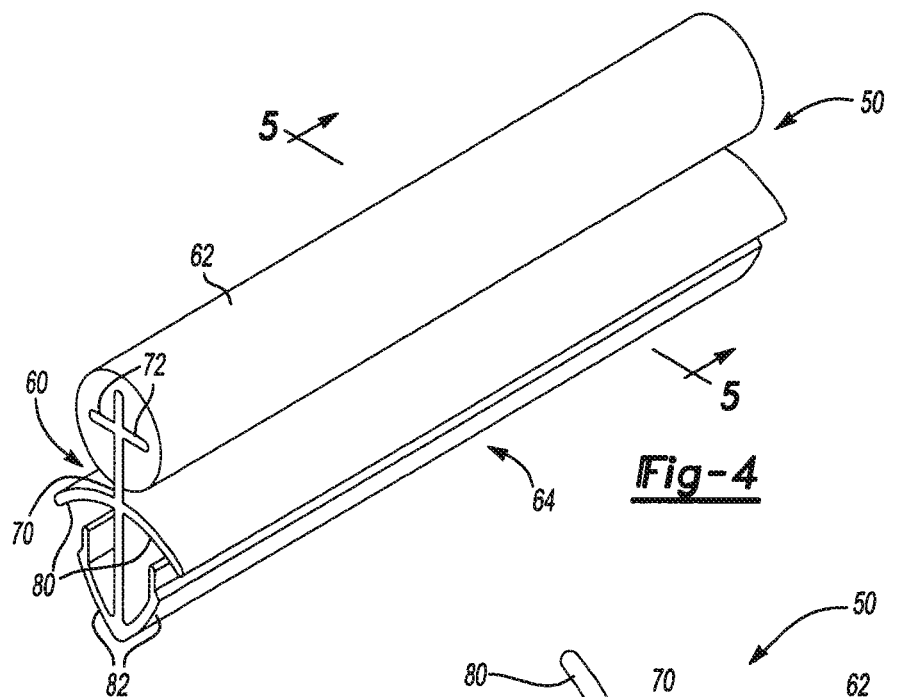
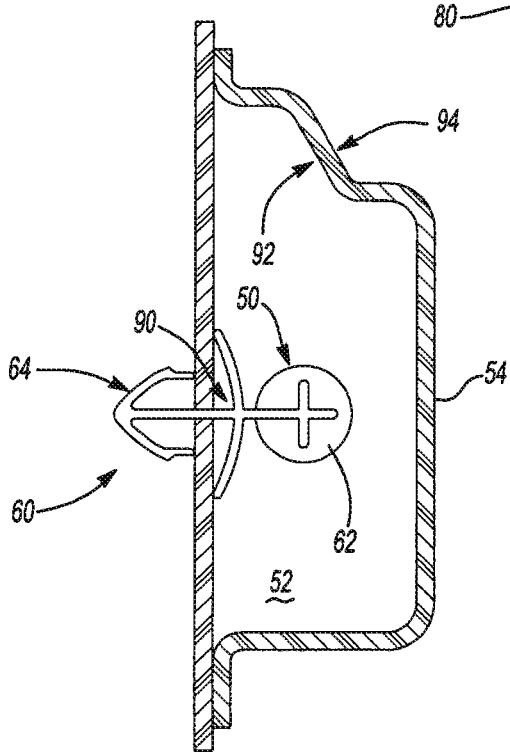

METHOD OF FORMING FASTENABLE MEMBER FOR SEALING, BAFFLING OR REINFORCING

CLAIM OF BENEFIT OF FILING DATE

The present application is a continuation of application Ser. No. 11/767,755, filed on Jun. 25, 2007, now U.S. Pat. No. 7,941,925 B2 which is a continuation of application Ser. No. 10/873,935, filed on Jun. 22, 2004, now U.S. Pat. No. 7,249,415 B2 which is a non-provisional of application Ser. No. 60/482,896, filed on Jun. 26, 2003 and the present application claims the benefit of the filing dates of these prior applications.

FIELD OF THE INVENTION

The present invention relates generally to a member, which is employed for providing sealing, noise/vibration reduction, structural reinforcement or a combination thereof.

BACKGROUND OF THE INVENTION

For many years, industry and particularly the transportation industry, has been concerned with designing members for providing baffling, sealing, structural reinforcement or the like to automotive vehicles. For example, U.S. Pat. Nos. 5,755,486; 4,901,500; and 4,751,249, each of which is incorporated herein by reference, describe exemplary prior art devices for baffling, sealing or reinforcing. Such members typically include an expandable material, which may or may not be combined with other components for forming a seal, a baffle, a structural reinforcement or the like in a cavity of an automotive vehicle.

Often times, however, assembly of such members to the automotive vehicles or other articles of manufacture can present difficulties. Moreover, difficulties can be presented when designing a member that can applied to various locations of an article of manufacture or various different articles of manufacture. Thus, the present invention seeks to provide a member for baffling, sealing or reinforcing that overcomes one of these difficulties or provides other advantages, which will become apparent upon reading the detailed description of the invention.

SUMMARY OF THE INVENTION

The present invention is directed to a member designed to provide baffling, sealing or reinforcement to an article of manufacture such as an automotive vehicle. The member generally includes a carrier, an expandable material and one or more fasteners. Preferably, the expandable material can be heat activated or otherwise activated to provide the baffling, sealing or reinforcement to the article of manufacture.

BRIEF DESCRIPTION OF THE DRAWINGS

The features and inventive aspects of the present invention will become more apparent upon reading the following detailed description, claims, and drawings, of which the following is a brief description:

FIG. 4 is a perspective view of another exemplary member in accordance with an aspect of the present invention.

FIG. 5 is a sectional view of the member of FIG. 4 taken along line 5-5.

FIG. 6 is a sectional view of the member of FIG. 1 applied to a structure of an automotive vehicle;

DETAILED DESCRIPTION OF THE PREFERRED EMBODIMENT

Figure 1:
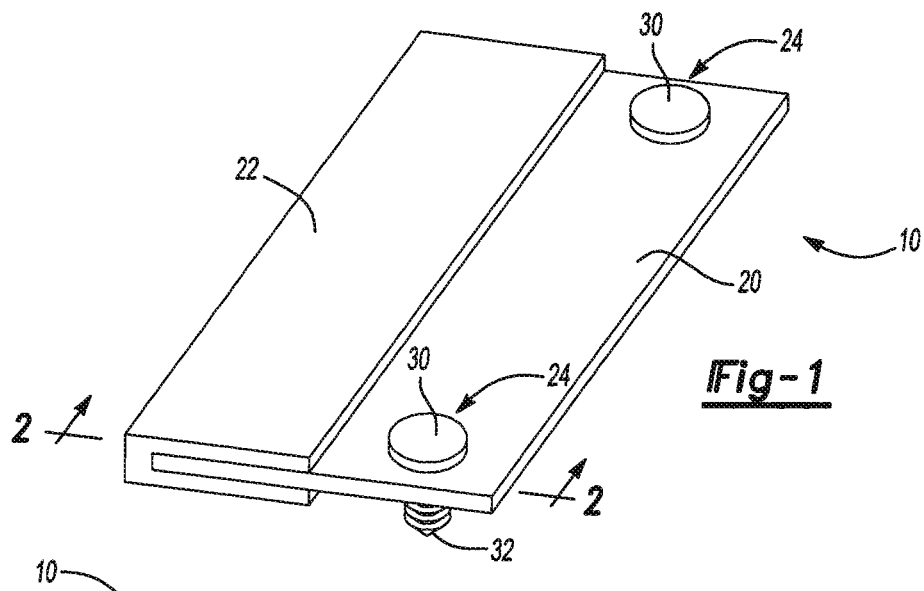
FIG. 1 is a perspective view of an exemplary member in accordance with an aspect of the present invention.

The present invention is predicated upon the provision of a member for providing baffling, sealing, reinforcing or a combination thereof to an article of manufacture. It is contemplated that the member may be applied (e.g., assembled) to various articles of manufacture such as boat, trains, buildings, appliances, homes, furniture or the like. It has been found, however, that the member is particularly suitable for application to automotive vehicles.

The member typically includes:
  a) a carrier;
  b) an expandable material disposed upon the carrier; and
  c) one or more fasteners, which may be attached to the carrier, the expandable material or both.

The member is typically assembled to an article of manufacture by attaching the one or more fasteners to a portion of the article such that the expandable material is located within a cavity or elsewhere upon the article. Thereafter, the expandable material is typically expanded to provide baffling, sealing or reinforcement to the article. Advantageously, the fasteners, the carrier or both can assist in assembly of the member to an article of manufacture. Moreover, the member can be formed using techniques that are efficient, inexpensive, expedient or a combination thereof.

The carrier of the present invention may be formed in a variety of shapes and in a variety of configurations according to the present invention. For example, the carrier may be planar or contoured, geometric or non-geometric, continuous or non-continuous, flexible or rigid, or otherwise configured. The carrier may also include only a single continuous part or may be formed of multiple parts directly connected to each other or connected through additional components.

The one or more fasteners of the present invention may also be provided in a variety of shapes and in a variety of configurations as long as they can secure the carrier, the expandable material or both to a structure. Examples of suitable fasteners include mechanical fasteners, clips, snap-fits, screws, combinations thereof or the like. Furthermore, it is contemplated that the one or more fasteners may be formed integral of a singular material with the carrier or may be formed of a different material and may be removably attached to the carrier.

According to one preferred embodiment, the fastener is provided as a magnetic material or an adhesive material that can attach (e.g., adhere or magnetically secure) the carrier and/or the expandable material to a metal or other structure. In such an embodiment, the magnetic material or the adhesive material may be interspersed with the carrier or the expandable material. Alternatively, the magnetic material or the adhesive material may be disposed upon the carrier or the expandable material or may be otherwise connected to the carrier or the expandable material.

The carrier and the one or more fastener may be formed of a variety of materials such as metal, polymers, elastomers, fibrous materials (e.g., cloth or woven materials), combinations thereof or the like. Preferably, the carrier and the one or more fasteners are at least partially formed of a polymeric material (e.g., a thermoplastic, an elastomer, a plastomer, a thermoset material, a plastic, a combination thereof or the like). In one embodiment, it is contemplated that the carrier, the one or more fasteners or both may be formed of the same material although typically they are formed of different materials.

The expandable material may be formed from a variety of suitable materials. Preferably, the expandable material is formed of a heat activated material having foamable characteristics. The material may be generally dry to the touch or tacky and may be shaped in any form of desired pattern, placement, or thickness, but is preferably of substantially uniform thickness. In one embodiment, it is contemplated that the expandable material has a shape substantially similar or identical to a portion of the cavity into which the material is placed, only the expandable material will be substantially smaller (e.g. at least about 100%, 1000%, 2000% or 3000% smaller) than the portion of the cavity until expanded.

Though other heat-activated materials are possible for the expandable material, a preferred heat activated material is an expandable polymer or plastic, and preferably one that is foamable. A particularly preferred material is a relatively high expansion foam having a polymeric formulation that includes one or more of an acrylate, an acetate, an elastomer, a combination thereof or the like. For example, and without limitation, the foam may be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of baffling or sealing foams are known in the art and may also be used to produce the foam. A typical foam includes a polymeric base material, such as one or more ethylene-based polymers which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable material before curing, and upon curing, the material will typically cross-link making the material incapable of further flow.

One advantage of the preferred foam materials over prior art materials is that the preferred materials can be processed in several ways. The preferred materials can be processed by injection molding, extrusion compression molding or with a mini-applicator. This enables the formation and creation of part designs that exceed the capability of most prior art materials.

While the preferred materials for fabricating the expandable material has been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766, 719; 5,755,486; 5,575,526; and 5,932,680, (incorporated by reference). In general, the desired characteristics of the material include high glass transition temperature (typically greater than 70 degrees Celsius), relatively high expansion and adhesion durability properties. In this manner, the material does not generally interfere with the materials systems employed by automobile manufacturers.

In applications where the expandable material is a heat activated, thermally expanding material, an important consideration involved with the selection and formulation of the material comprising the foam is the temperature at which a material reaction or expansion, and possibly curing, will take place. Typically, the foam becomes reactive at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges. Generally, suitable expandable foams have a range of expansion ranging from approximately 0 to over 1000 percent.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

It is contemplated that the expandable could be delivered and placed into contact with the carrier, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

Formation of the member of the present invention may include a variety of processing steps depending on the desired configuration of the member. In any event, it is generally contemplated that the carrier, the fastener and the expandable material may be manually attached to each other, automatically attached to each other or a combination thereof. Moreover, various processes such as molding (e.g., compression, injection or other molding), extrusion or the like may be used to form the carrier, the fastener or the expandable material individually and such processes may be employed to attach these components together.

Figure 2:
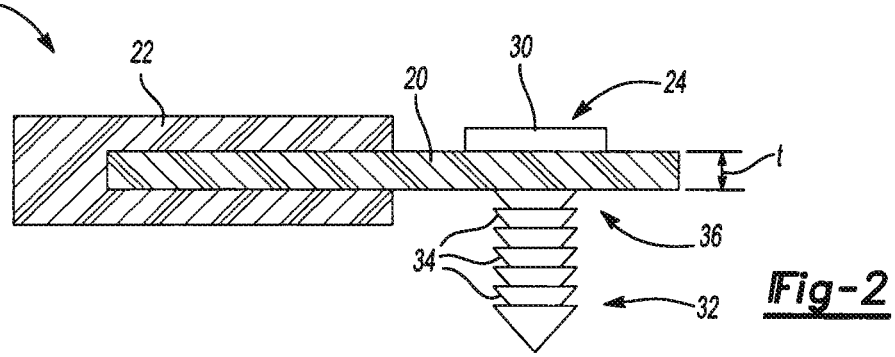
FIG. 2 is a sectional view of the member of FIG. 1 taken along line 2-2.
Figure 3:
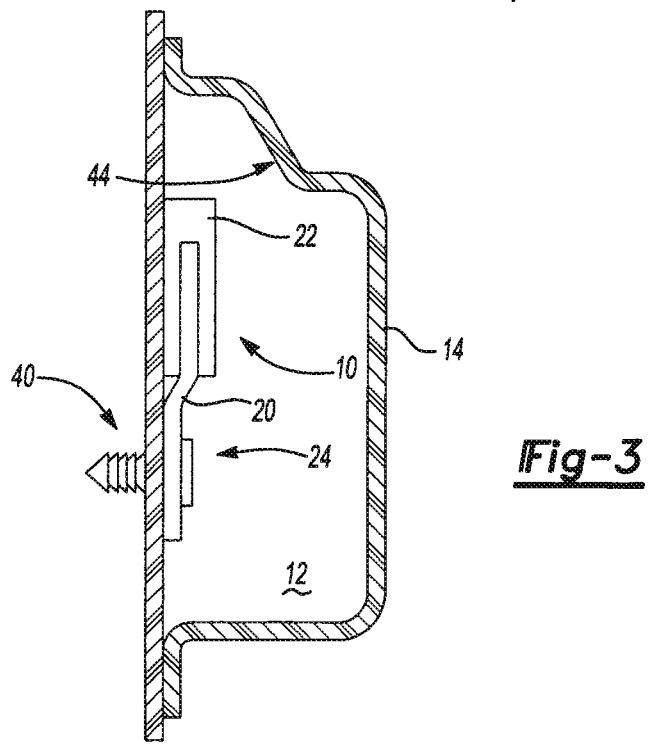
FIG. 3 is a sectional view of the member of FIG. 1 applied to a structure of an automotive vehicle.

As a first example of a member according to the present invention, reference is made to FIGS. 1-3, which illustrates an exemplary member 10 configured for placement within a cavity 12 of a structure 14 of an automotive vehicle (not shown) for forming a baffling, sealing or reinforcement system 1 along with the structure 14 of the automotive vehicle. As will be appreciated, the member 10 may be suited for placement in a variety of cavities for reinforcing, baffling or sealing a variety of structures within the automotive vehicle. For purposes of illustration, the member 10 is shown as being assembled to a pillar or rocker structure 14 of an automotive vehicle, although it will be understood that the member 10 may be assembled to a variety of automotive structures (e.g., body members, frame members or the like) or to a variety of structure of other articles of manufacture.

The member 10 has an overall rectangular configuration, but may be formed in a variety of shapes. Generally, the member 10 includes a carrier 20 with an expandable material 22 disposed thereon. The member 10 also includes a pair of fasteners 24 attached to the carrier 20.

The carrier 20 may be formed in any of the shapes or configurations discussed herein and may be formed of any of the materials discussed herein. In the illustrated embodiment, the carrier 20 is generally rectangular and is formed of a polymeric film (e.g., a polyester film). The thickness (t) of the polymeric film shown is preferably below about 1 cm, more preferably below about 0.5 mm and even more preferably below about 0.3 mm, although thickness of the carrier 20 may vary widely for different shapes and applications. The carrier 20 in FIGS. 1-3 is generally flexible and has an elongation at break of greater at about 20° C. of greater than about 5%, more preferably greater than about 50%, even more preferably greater than about 100%.

Alternative films or layer materials which may be employed in the present invention are disclosed in U.S. Pat. No. 6,287,669 and U.S. patent application Ser. No. 09/923,138, filed Aug. 6, 2001, both of which are incorporated herein by reference for all purposes.

The expandable material 22 may be any of the expandable materials disclosed herein. In the illustrated embodiment, the expandable material 22 is a material that experiences relatively high levels of expansion upon exposures to temperatures of between about 148.89° C. to 204.44° C. (about 300° F. to 400° F.) (i.e., temperatures typically experienced in automotive painting or coating operations). Accordingly, the preferred expandable material 22 is configured to have a volumetric expansion of at least about 1500%, more preferably at least about 2000%, even more preferably at least about 2500% and still more preferably at least about 3000% its original or unexpanded volume. An example of such an expandable material with such expansion capabilities is disclosed in commonly owned copending U.S. Patent Application 60/482,897 titled Expandable Material, filed on the same date as the present application and fully incorporated herein by reference for all purposes.

The expandable material 22 is generally shaped in a rectangular or block configuration, but may be shaped as needed or desired depending upon the application of the member. In the embodiment shown, the expandable material 22 is disposed upon two opposing surfaces of the carrier 20 and substantially encloses an elongated edge of the carrier 20. Of course, it is contemplated that the material may be otherwise disposed upon the carrier 20 and may be applied to the carrier as a single piece (e.g., strip) or multiple pieces (e.g., strips).

The skilled artisan will be able to think of a variety of fasteners suitable for use in the member 10 of the present invention. Preferred examples have been disclosed herein, however, others may also be employed. The fasteners 24 of the member 10 shown are plastic and include a cap portion 30 and an elongated portion 32. As shown, the elongated portion 32 include a plurality of extensions 34 that are illustrated as conical, but which may be otherwise shaped as desired.

Attachment of the fasteners 24 to the carrier 20 may be accomplished according to any of the techniques described herein or by other techniques. For attachment to the carrier 20 of FIGS. 1-3, the elongated portion 32 of each of the fasteners 24 extends into and preferably through an opening 36 (e.g., a through-hole) formed in the carrier 20. In this manner, the extensions 34, the cap 30 or both interference fit the fastener 24 to the carrier 20.

Generally, formation of the member 10 includes shaping of the carrier 20 into a desired configuration, application of the expandable material 22 to the carrier 20 and optionally, depending upon the configuration, attachment of the fasteners 24 to the carrier 20, the expandable material 22 or both. It should be recognized that within this general approach, the member 10 illustrated may be formed using a variety of more specific techniques. For exemplary purposes, however, one preferred technique is described in detail.

According to the preferred technique, material (i.e., film material) for the carrier 20 is provided as an elongated strip to an extrusion die in a continuous or non-continuous manner. At the same time, the expandable material 22 is being emitted from an extruder to the same extrusion die also in a continuous or non-continuous manner. As both the elongated strip and the expandable material are fed to and through the extrusion die (e.g., by coextrusion), the expandable material intimately contacts and adheres to the elongated strip with a sectional configuration as shown in FIG. 2. If desired, the portion of the elongated strip onto which the expandable material is extruded may be perforated (e.g., include one or more through-holes) for improving the strength of attachment between the expandable material and the carrier material.

After extrusion, the strip and the expandable material are preferably cut at predetermined lengths, which correspond to a length of the member 10. Formation of the openings 36 in the carrier 20 or carrier material may be accomplished by cutting, punching or any other suitable technique. The openings 36 for the fasteners 24 may be formed in the carrier 20 or carrier material before or after the extrusion of the expandable material onto the strip of carrier material. Moreover, the fasteners 24 may be inserted into the openings 36 prior to or after extrusion. Depending, upon the order of steps, the member may be completely formed when the elongated strip and expandable material are cut at predetermined lengths or thereafter.

The carrier 20 is assembled to the structure 14 in FIG. 3 by attaching the fasteners 24 to the structure 14. In the particular embodiment illustrated, the elongated portion 32 of each of the fasteners 24 is extended into a respective opening 40 (e.g., cavity, through-hole or the like) in the structure 14 of the automotive vehicle. Upon insertion, the extensions 34 of the fasteners 24 interference fit the fasteners 24 to the structure 14 thereby securing the fasteners 24, the carrier 20 and the expandable material 22 to the structure 14. Advantageously, as shown in FIG. 3, the flexibility of the carrier 20 allows the carrier to bend or contour to allow attachment of the fasteners 24 to the structure 14. Moreover, it is contemplated that, for structure including contoured surfaces, the carrier can flex or bend to adapt to such surfaces.

Once assembled to the structure 14, the expandable material 22 is exposed to heat, which is preferably, although not necessarily, provided during a coating or painting operation performed upon the automotive vehicle. In turn, the heat activates the expandable material 22 to expand (e.g., foam) such that the expandable material 22 contacts, wets and adheres to surfaces 42, 44, 46 of the structure 14 that define the cavity 12. Thus, a system is formed that includes the structure 14 defining the cavity 12 and including the expandable material 22 in an expanded condition thereby at least partially filling the cavity 12 for sealing, baffling, or reinforcing the structure 14. Preferably, the (e.g., the cross-section shown) expandable material 22 substantially entirely spans the entirety of one or more cross-section of the cavity 12 for sealing the cavity 12 such that no openings are available thereby prohibiting the passage of debris, water, sound, air or a combination thereof through the cavity 12.

As a second example of a member according to the present invention reference is now made to FIGS. 4-6, which illustrate another exemplary member 50 configured for placement within a cavity 52 of a structure 54 of an automotive vehicle (not shown) for forming a baffling, sealing or reinforcement system along with the structure 54 of the automotive vehicle. As will be appreciated, the member 50 may be suited for placement in a variety of cavities for reinforcing, baffling or sealing a variety of structures within the automotive vehicle. For purposes of illustration, the member 50 is shown as being assembled to a pillar structure 54 of an automotive vehicle, although it will be understood that the member 50 may be assembled to a variety of automotive structures (e.g., body members, frame members or the like) or to a variety of structures of other articles of manufacture.

The member 50 is shown as elongated, but may be shortened as desired or need. Generally, the member 50 includes a carrier 60 with an expandable material 62 disposed thereon. The member 50 also includes a fastener 64 attached to the carrier 60.

The carrier 60 may be formed in any of the shapes or configurations discussed herein and may be formed of any of the materials discussed above. In the illustrated embodiment, the carrier 60 includes a base 70 that is substantially planar and generally rectangular. The carrier 60 also includes optional extensions 72 extending away from the base 70.

The skilled artisan will be able to think of a variety of fasteners suitable for use in the member 50 of FIGS. 4-6. The fastener 64 shown is comprised of a pair of first extensions 80 and a pair of second extensions 82. It is contemplated, however, that the fastener 64 may be formed with only one first extension, one second extension or both. As shown, one of the first extensions 80 extends from a first side of the base 70 and one of the first extensions 80 extends from a second side of the base 70. Both of the first extensions 80 are illustrated as contoured (e.g., arced) at least partially toward an edge 84 of the base 70. Each of the second extensions 82 extend from the edge 84 of the base 70 respectively toward a different one of the first extensions 80. In alternative embodiments, however, it is contemplated that the first extensions, the second extensions or both may extend in different directions and may extend from different locations than those described.

In the embodiment shown, there is only one fastener 64 that is generally coextensive with the base 70. However, it is contemplated that the fastener 64 may be intermittent and may, therefore, form multiple fasteners. Alternatively, one fastener may be employed that is not substantially coextensive with the base 70.

The expandable material 62 may be any of the expandable materials disclosed herein. In the illustrated embodiment, the expandable material 62 is a material that experiences relatively high levels of expansion upon exposures to temperatures of between about 148.89° C. to 204.44° C. (about 300° F. to 400° F.) (i.e., temperatures typically experienced in automotive painting or coating operations). Accordingly, the preferred expandable material 62 is configured to have a volumetric expansion of at least 1500%, more preferably at least 2000%, even more preferably at least 2500% and still more preferably at least 3000% its original or unexpanded volume.

The expandable material 62 is generally shaped in a cylindrical configuration, but may be shaped as needed or desired depending upon the application of the member. In the embodiment shown, the expandable material 62 is disposed upon the two opposing surfaces of the base 70 of the carrier 60 and substantially encloses an elongated edge of the carrier 60. Of course, it is contemplated that the material may be otherwise disposed upon the carrier 60.

Generally, the formation of the member 50 includes shaping of the carrier 60 the fastener 64 or both into a desired configuration and application of the expandable material 62 to the carrier 60. It should be recognized that within this general approach, the member 50 illustrated may be formed using a variety of more specific techniques. For exemplary purposes, however, one preferred technique is described in detail. Preferably, the fastener 64, the extensions 80, 82, of the fastener 64, the extensions 72 of the base 70, the base 70 or a combination thereof are integrally formed (e.g., extruded, molded or the like) of a single material.

According to the preferred technique, material (i.e., nylon) for the carrier 60 is provided to an extruder (e.g., a twin-screw extruder) and extruded through a first die to produce an extrudate with the sectional configuration of the carrier 60 as shown in FIG. 5. Thereafter or at the same time, the expandable material 62 is also emitted from an extruder (either the same or a different extruder) and both the carrier extrudate and the extruded expandable material or fed to a second extrusion die (preferably in a cross-head die extrusion operation) in a continuous or non-continuous manner. As both, the elongated strip and the expandable material are fed to and through the extrusion die, the expandable material intimately contacts and adheres to the carrier extrudate in the sectional configuration shown in FIG. 2. If desired, the portion of the extrudate onto which the expandable material is extruded may be perforated for improving the strength of attachment between the expandable material and the carrier material.

Generally, a variety of extruders may be employed to form the members, the materials, the carriers, the fasteners, a combination thereof or the like according to the present invention. According to one preferred embodiment of the invention, the extruder employed is a single screw extruder, which may also be known a kneader, a continuous kneader or a co-kneader, but may be a multi-screw (e.g., twin screw extruder). When used, the single screw extruder preferably includes a single segmented screw with interrupted screw flights and stationary pins both located in an extruder barrel. In operation, the single screw extruder preferably performs a distributive type mixing upon whatever material is forming a desired component of the present invention. As an example, such mixing may be obtained by having the screw rotate and reciprocate back and forth at the same time such that the material is mixed due to forward pumping but the material is also divided each time it passes a pin for causing the distributive type mixing.

Advantageously, the single screw extruder, the distributive mixing or both can provide sufficient intermixing of material ingredients while imparting lower energy to the material thereby maintaining and applying the material at a lower temperature. In turn, more reactive or lower activation temperature blowing agents, blowing agent activators or both may be employed particularly for expandable materials. As an example, it is contemplated that such an extruder can maintain and can apply material at temperatures of less than about 150° C., more preferably less than about 120° C. and even more preferably less than about 70° C. As an added advantage, it is contemplated that such an extruder is less likely to tear reinforcement fillers such as carbon fibers, glass fibers, nylon fibers or aramid pulp thereby allowing the formation of a material with greater integrity.

Figure 7:
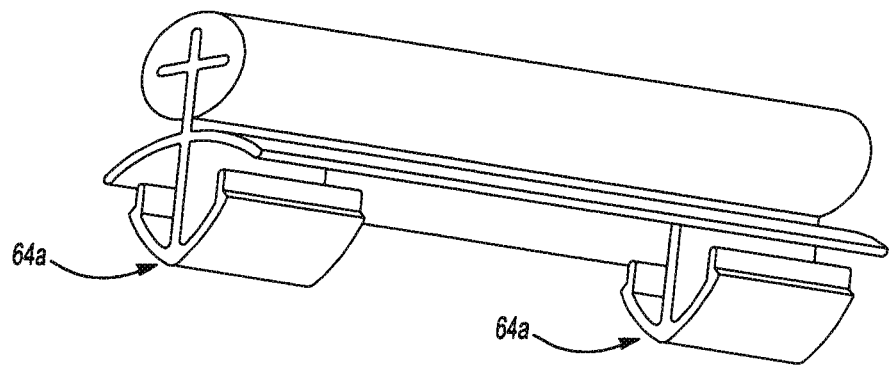
FIG. 7 is a perspective view of an alternative member in accordance with an aspect of the present invention.

After extrusion, the carrier extrudate and the expandable material are preferably cut at predetermined lengths, which correspond to a length of the member 50. At this juncture, the member 50 is substantially formed as shown in FIGS. 4-6. For forming the member 50 with multiple fasteners or with one or more fasteners that are not coextensive with the expandable material 62, portions of the fastener 64, the base 70 or both may be cut away and optionally recycled through the extruder. An example of such a member having two fasteners 64(a), which will operate in the same manner as the fastener 64 of FIGS. 4-6 is shown in FIG. 7

Referring again to FIGS. 4-6, the carrier 60 is assembled to the structure 54 in FIG. 6 by attaching the fastener[s] 64 to the structure 54. In the particular embodiment illustrated, the pair of second extensions 82 and a portion of the base 70 are extended through an opening 90 (e.g., a through-hole) in the structure 54. Preferably, the extensions 82 are flexed toward each other as they are passed through the opening 90 until they are entirely through the opening 90 such that the extensions 82 can spread away from each other and interference fit the member 50 to the structure 54. Upon creating such an interference fit, the pair of first extensions 80 preferably abut an inner surface 92 of the structure 54 and the second extensions 82 abut an outer surface 94 of the structure 54 thereby limiting motion of the base 70 and the rest of the member 50 relative to the structure 54.

Once assembled to the structure 54, the expandable material 62 is exposed to heat, which is preferably, although not necessarily, provided during a coating or painting operation performed upon the automotive vehicle. In turn, the heat activates the expandable material 62 to expand (e.g., foam) such that the expandable material 62 contacts, wets and adheres to surfaces 92 of the structure 54 that define the cavity 52. Thus, a system is formed that includes the structure 54 defining the cavity 52 and including the expandable material 62 in an expanded condition at least partially filling the cavity 52 for sealing, baffling, or reinforcing the structure 54. Preferably, the expandable material 62 substantially entirely spans one or more cross-sections (e.g., the cross-section shown is FIG. 6) of the cavity 52 for sealing the cavity 52 such that no openings are available thereby prohibiting the passage of debris, air, water, sound or the like through the cavity 52.

Figure 8:
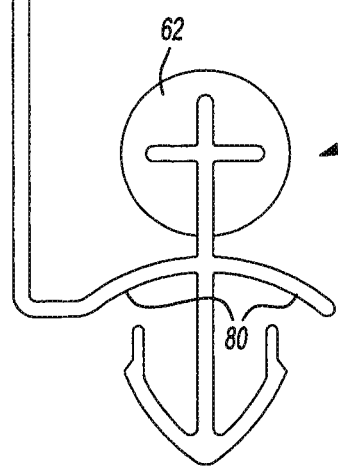
FIG. 8 is a sectional view of another alternative member in accordance with an aspect of the present invention.

In one alternative embodiment, it is contemplated that a member according to the present invention may include one or more extension for assisting in guiding the expansion of the expandable material. For example, in FIG. 8, there is illustrated the member 50 of FIGS. 4-6 wherein one of the first extensions 80 includes a further extension 100 extending at an angle relative to the first extension 80 and in generally opposing relation with the expandable material 62.

Figure 9:
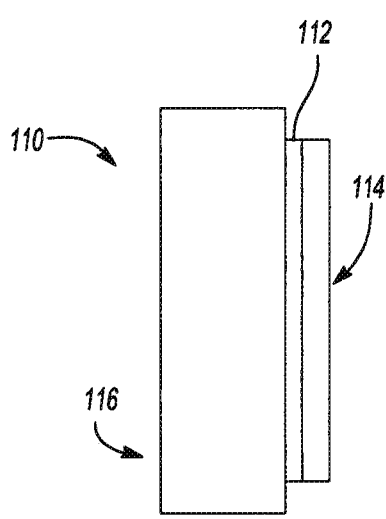
FIG. 9 is a sectional view of still another alternative member in accordance with an aspect of the present invention.
Figure 10:
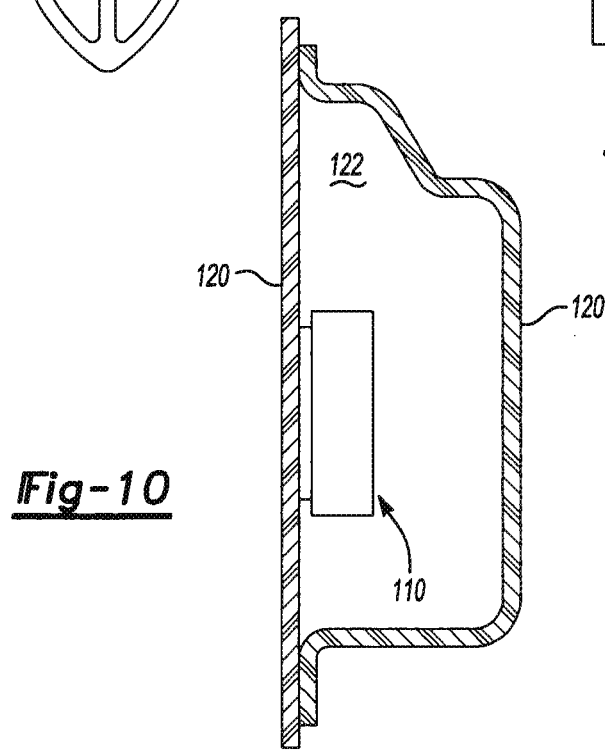
FIG. 10 is a sectional view of the member of FIG. 9 applied to a structure of an automotive vehicle.

Referring to FIGS. 9 and 10, there is illustrated a member 110 having a carrier 112 that includes a magnetic fastener 114 and an expandable material 116 disposed upon the carrier 112. In the embodiment shown, the carrier 112 is formed as a strip of a plastic material having the magnetic fastener 114 disposed upon the carrier 112 as a magnetic strip. It is contemplated, however, that the carrier 112 and the fastener 114 may include only a magnetic strip such that they are one in the same. As another alternative, it is contemplated that the fastener 114 may be magnetic material (e.g. particles), which are intermixed with the expandable material 116.

For forming the member 110, the expandable material 116 may be applied to the carrier 112, the fastener 114 according a variety of manual, semi-automated or fully automated techniques. For example, the expandable material 116 and the carrier 112, the fastener 114 or both may be coextruded or cross-head extruded according to one of the techniques described for the members described above.

For application of the member 110 to a structure 120 as shown in FIG. 10, the fastener 114 (i.e., the magnetic material) is expose to a surface (e.g., a metal surface) of the structure 120 to which the fastener is magnetically attracted. In turn, the fastener 114 secures the expandable material 116 in place (e.g., in a cavity 122) until it expands as described in relation to the other embodiments above.

In addition to the magnetic material, it is also contemplated, as discussed above, that a pressure-sensitive material (e.g., a tacky adhesive material, a two-way tape or the like) may be employed in place of the magnetic material as the fastener of the member. In such an embodiment, the pressure-sensitive material could be applied to the expandable material by any of the methods discussed herein (e.g., co-extrusion, manual or automatic methods or the like). Moreover, the pressure-sensitive material may be employed to secure (e.g., adhesively secure) the member to a structure is a manner similar to or the same as that used for the magnetic material.

ALTERNATIVE EMBODIMENTS

As previously discussed, the fastener, the carrier and the expandable material may be formed in a variety of configurations according to the present invention. For exemplary purposes, several of those shapes and configurations are illustrated in FIGS. 11A-18C.

The carrier will typically be formed with a profile, which may be an extrusion profile (i.e., a profile dependent upon the die through which the carrier material is extruded) or a profile based upon the type of material used for the carrier and the manner in which the material is provided. Generally, it is contemplated that dimensions of the profile of the carrier can change (e.g., become thicker or thinner) at different cross-sections taken along a dimension (e.g., a length or other dimension substantially perpendicular to the profile) of the carrier, but typically the dimensions remain substantially uniform.

Figure 11A:
FIGS. 11A-18C illustrate examples of variation of the member of the present invention.
Figure 11B:
Figure 11C:
Figure 12A:
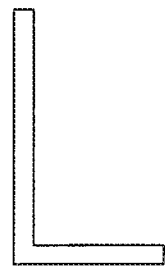
Figure 12B:
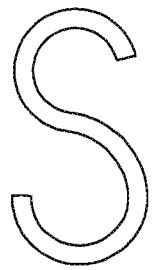
Figure 12C:
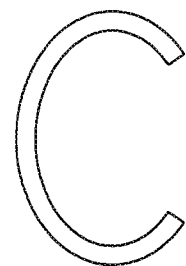
Figure 13A:
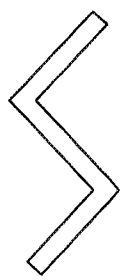
Figure 13B:
Figure 13C:

As respectively shown in FIGS. 11A-11B, the carrier may have a straight profile, an angled profile, an arced profile, a combination thereof or the like. As respectively shown in FIGS. 12A-12C, the carrier may have an L-shaped profile, an S-shaped profile, a C-shaped profile, a profile shaped according to any other letter of the alphabet, a combination thereof or the like. As respectively shown in FIGS. 13A-13C, it is further contemplated that the carrier may have a zig-zag profile, a wavy profile, an oblong profile, a combination thereof or the like. Of course, these profiles are shown for exemplary purposes only and are in no way intended to limit the shape of the carrier.

The expandable material, like the carrier, will also typically be formed with a profile, which may be an extrusion profile (i.e., a profile dependent upon the die through which the expandable is extruded) or a profile based upon the type of material used for the expandable material and the manner in which the expandable material is provided. Generally, it is contemplated that dimensions of the profile of the expandable material can change (e.g., become thicker or thinner) at different cross-sections taken along a dimension (e.g., a length or other dimension substantially perpendicular to the profile) of the expandable material, but typically the dimensions remain substantially uniform.

Figure 14A:
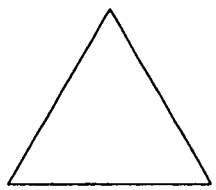
Figure 14B:
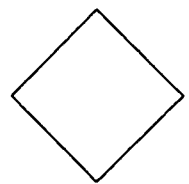
Figure 14C:
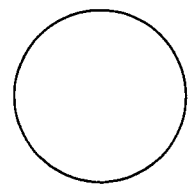
Figure 15A:
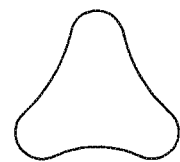
Figure 15B:
Figure 15C:
Figure 16A:
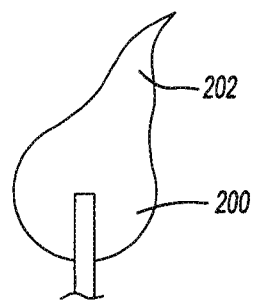
Figure 16B:
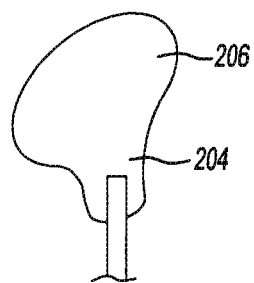
Figure 16C:
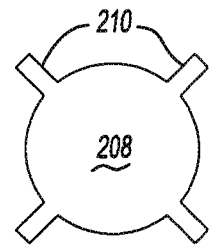
Figure 17A:
Figure 17B:
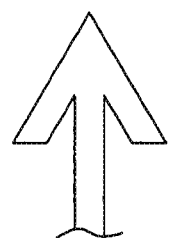
Figure 17C:
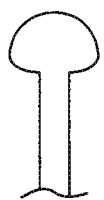
Figure 18A:
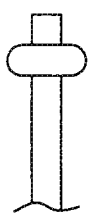
Figure 18B:
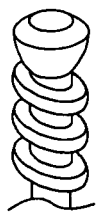
Figure 18C:
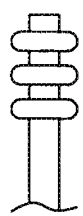

As respectively shown in FIGS. 14A-14B, the expandable material may have a triangular profile, a diamond-shaped profile, a circular profile, a combination thereof or the like. As respectively shown in FIGS. 15A-15C, the expandable material may have a non-geometric profile, a square profile, a rectangular profile a combination thereof or the like. As respectively shown in FIGS. 16A-16B, it is further contemplated that the expandable material may have a profile with a larger base portion 200 attached to a carrier and a smaller extension portion 202 extending therefrom, an extension portion 204 attached to a carrier and extending to a larger base portion 206. In FIG. 16C, there is illustrated a profile of an expandable material having a central base portion 208 and a plurality of extensions 210, which may assist in locating and/or securing the expandable material (e.g., in a cavity). Of course, these profiles are shown for exemplary purposes only and are in no way intended to limit the shape of the carrier.

The fastener, particularly when used to form an interference fit, will typically include one or more protrusions or extensions, which may extend from a portion of the fastener, a portion of the carrier, a portion of the expandable material or a combination thereof for effecting the interference fit. As shown respectively in FIGS. 17A-17B, the fastener may include one extension, multiple extensions or a singular thicker portion (e.g. shown as a bulbous protrusion). As shown respectively in FIGS. 18A-18C, the fastener may include a single annular protrusion, may be threaded or may include multiple annular protrusions. Again, these fastener configurations are shown for exemplary purposes only and are in no way intended to limit the configuration of the fastener.

Figure 19A:
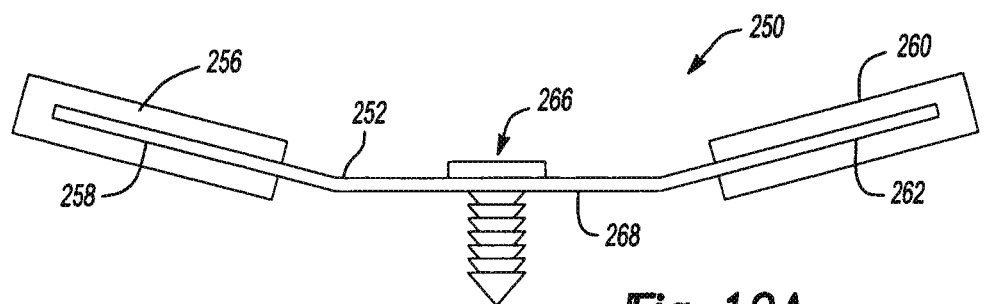
FIG. 19A is a sectional view of another alternative member in accordance with an aspect of the present invention.
Figure 19B:
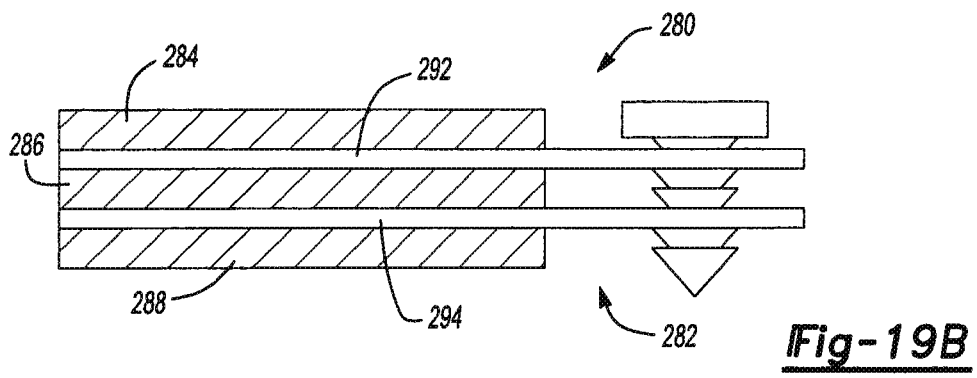
FIG. 19B is a sectional view of another alternative member in accordance with an aspect of the present invention.

In additional alternative embodiments, it is contemplated that the member of the present invention may include multiple separate masses of expandable material and the masses may be configured to volumetrically expand the same amount or different amounts relative to each other. As an example, FIG. 19A illustrates a member 250 that includes a polymeric film carrier 252 with a first mass 256 of expandable material on one side 258 of the carrier 252 and a second mass 260 of expandable material on another opposite side 262 of the carrier 252. It can also be seen that the member includes one or more fasteners shown as a push pin 266 extending through one or more openings in a central portion 268 of the carrier 252 between the two masses 256, 260 of expandable material. FIG. 19B illustrates a member 280 that includes a polymeric film carrier 282 with a first mass 284, a second mass 286 and a third mass 288 of expandable material. The carrier 282 is formed of a first polymeric film 292 and a second polymeric film 294. As can be seen, the second mass 286 of expandable material is sandwiched between the first mass 284 of expandable material and the third mass 288 of expandable material and also sandwiched between the first polymeric film 292 and the second polymeric film 294.

Figure 20:
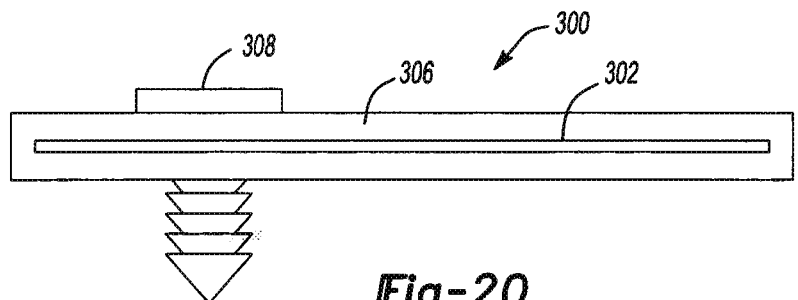
FIG. 20 is a perspective view of another alternative member in accordance with an aspect of the present invention.

In another alternative embodiment shown in FIG. 20, there is a member 300 having a carrier 302 that is a polymeric film and is substantially enclosed within a mass 306 of expandable material. In the embodiment, one or more fasteners shown as a push-pin 308 extend through the carrier 302 and the mass 306 of expandable material.

Figure 21:
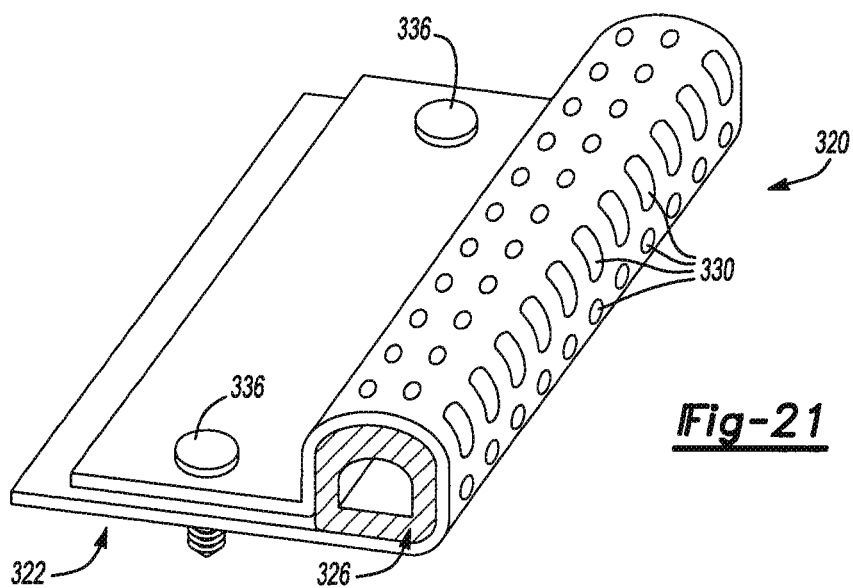
FIG. 21 is a perspective view of another alternative member in accordance with an aspect of the present invention.

In still another alternative embodiment shown in FIG. 21, there is a member 320 having a polymeric film carrier 322 that is folded back onto itself such that the carrier 322 is wrapped about a mass 326 of expandable material. A plurality of openings shown as through-holes 330 extend through the carrier 322 at the portion of the carrier 322 that is wrapped about and surrounds the mass 326 of expandable material. Moreover, one or more fasteners shown as push-pins 336 extend through two layers of the polymeric film carrier 322. Advantageously, the mass 326 of expandable material, upon expansion, can flow through the through-holes 330 for adhering to walls of a structure.

It should be understood that the members 250, 280, 300, 320 of FIGS. 19A, 19B, 20 and 21 and the other alternative embodiments may be formed and applied according to any of the techniques described herein.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming members for providing sealing, baffling or reinforcement to one or more structures, the method comprising:
   providing an expandable material and a carrier material;
   co-extruding the expandable material and carrier material whereby the expandable material is extruded in a cylindrical profile onto and surrounding a substantially planar carrier portion of the carrier material prior to expansion of the expandable material;
   providing a fastener connected to the carrier portion, the fastener including one or more extensions;
   locating the expandable material into a vehicle cavity by placing the fastener through an opening in a cavity wall.

2. A method as in claim 1 wherein the step of forming the expandable material in a cylindrical shape includes cutting the expandable material to form individual members.

3. A method as in claim 1 wherein the expandable material is formed by cross-head extrusion.

4. A method as in claim 1 wherein the fastener is a mechanical fastener that is separately formed from the expandable material.

5. A method as in claim 1 wherein the expandable material is adapted for forming a sealing material, an acoustical material, an adhesive, a structural foam, or a combination of at least two of the foregoing.

6. A method as in claim 1 wherein the expandable material is a material that is thermally deformable at a temperature of extrusion, but upon thermal activation at an elevated temperature will cross link to form a thermoset material.

7. A method as in claim 1 wherein the expandable material includes a plastic selected from the group consisting of thermoplastics, thermosets, or a combination thereof or a resin selected from the group consisting of an epoxy resin, a thermoplastic resin, an acetate resin, an EPDM resin, a phenoxy resin, a polyurethane resin or a combination thereof.

8. A method as in claim 1 wherein at least a portion of the fastener is embedded in the expandable material.

9. A method as in claim 1 wherein the expandable material is extruded through an extruder selected from a single-screw extruder, a twin-screw extruder or a mini-applicator to dispose the expandable material on the carrier material.

10. A method as in claim 1 wherein the expandable material volumetrically expands to a size that is at least 3000% its original size up exposure to elevated temperatures.

11. A method as in claim 1 wherein the expandable material has a configuration that has a substantially uniform thickness.

12. The method of claim 1, wherein the fastener is integrally formed with the carrier material.

13. The method of claim 1, including a step of connecting the fastener to one or more of the carrier material, the expandable material, or both after co-extrusion of the expandable material and carrier material and cutting of the expandable material and carrier material.

14. A method of forming members for providing sealing, baffling or reinforcement to one or more structures, the method comprising:
  providing an expandable material having a substantially uniform thickness and a carrier material;
  co-extruding the expandable material and carrier material whereby the expandable material is extruded in a cylindrical profile onto and surrounding a substantially planar carrier portion of the carrier material prior to expansion of the expandable material;
  providing a fastener connected to the carrier portion, the fastener including a plurality of extensions;
  locating the expandable material into a vehicle cavity by placing the fastener through an opening in a cavity wall whereby at least two of the extensions are extended through the opening, the extensions being flexed toward one another until located through the opening and spread away from each other once through the opening to form an interference fit between the member and the cavity wall.

15. The method of claim 14 wherein the expandable material volumetrically expands to a size that is at least 3000% its original size up exposure to elevated temperatures.

16. The method of claim 14, wherein the fastener is integrally formed with the carrier material.

17. The method of claim 14, wherein the step of forming the expandable material in a cylindrical shape includes cutting the expandable material to form individual members.

18. The method of claim 14, wherein the expandable material is a material that is thermally deformable at a temperature of extrusion, but upon thermal activation at an elevated temperature will cross link to form a thermoset material.

19. The method of claim 14, wherein at least a portion of the fastener is embedded in the expandable material.

20. The method of claim 14, including a step of connecting the fastener to one or more of the carrier material, the expandable material, or both after co-extrusion of the expandable material and carrier material and cutting of the expandable material and carrier material.

* * * * *